Patented June 13, 1944

2,351,000

UNITED STATES PATENT OFFICE 2,351,000

PROCESS OF MAKING 2,2,3 TRICHLORO- AND TRIBROMO-ALKANAL-1 COMPOUNDS AND THE HYDRATES THEREOF

Ralph L. Brown, Swarthmore, Pa., and Ralph E. Plump, Haddonfield, N. J., assignors to The Pennsylvania Salt Manufacturing Company, Philadelphia, Pa., a corporation of Pennsylvania No Drawing. Application February 5, 1941, Serial No. 377,572

15 Claims. (Cl. 260—601)

Our invention relates to a simple and economical method of making a 2,2,3 trichloro- or tribromo-alkanal-1 compound, from the propanal to the heptanal derivative of the general type of 2,2,3 trichloropropanal-1 and 2,2,3 trichlorobutanal-1, and the corresponding hydrate; and more particularly, it relates to a process for the synthesis of a compound of this class by the direct chlorination or bromination of an unsaturated aldehyde, for example, in the case of the specific compounds mentioned the direct chlorination of acrolein and crotonaldehyde, respectively.

While these compounds are useful in medicinal and industrial fields, difficulties are encountered in their preparation by the use of the available methods of synthesis. According to one method for the preparation of 2,2,3 trichlorobutanal-1, chlorine is passed for twenty-four hours into paraldehyde (trimer acetaldehyde), and an alternative procedure involves the use of acetaldehyde in a freezing bath (Beilstein, vol. 1, p. 664; Liebig's Annalen, vol. 179, p. 26). These methods require long periods of reaction and troublesome purification procedures, and give poor yields. In another process for the preparation of the same compound, involving a minimum of three reaction steps and necessary parallel purification operations, the desired compound is prepared by the addition of chlorine to 2-chlorocrotonaldehyde, which must be prepared from 2,3 dichloro-butylaldehyde (from chlorine and crotonaldehyde) and which is an unstable compound due to its tendencies for resinification and polymerization (this method is described in Beilstein, vol. 1, p. 664; Zeisel, Monatshefte für Chemie, vol. 4, p. 533; and Bull. Soc., vol. 29, pp. 29-34).

Direct chlorination or bromination of unsaturated aldehydes, such as acrolein and crotonaldehyde, should theoretically, if the degree of chlorination or bromination and the orientation of the entering chlorine or bromine atoms could be controlled, give the corresponding 2,2,3 trichloro- or tribromo-alkanal-1, but up to the present time the methods employed in chlorinating or brominating the unsaturated aldehydes to yield the desired product in significant amounts have failed. For example, our experiments have shown that it is impossible to obtain a product of a proper specific gravity and boiling point for a trichlorobutanal derivative or one which will yield with water the hydrate usually called butyl chloral hydrate (2,2,3 tricholorbutanal-1-monohydrate) by merely passing chlorine into crotonaldehyde in accordance with the usual chlorination methods. This was found to be true at all temperatures up to the boiling point of the liquid even with prolonged periods of chlorination and with the highest purity crotonaldehyde.

By the present invention, however, a process is provided by which the direct chlorination or bromination of the unsaturated aldehydes proceeds smoothly and rapidly at low temperatures to yield a substantially pure 2,2,3 trichloro- or tribromo-alkanal-1 compound of proper specific gravity, boiling point, and of ready and rapid hydrating properties.

The principal object of the present invention is, therefore, to provide a process for the synthesis of a 2,2,3 trichloro- or tribromo-alkanal-1 compound and its hydrate from the corresponding unsaturated aldehyde and chlorine or bromine in an expedient manner in non-specialized equipment.

Another object of the invention is to furnish a process for making such compounds and their hydrates, of satisfactory quality for industrial use without purification, in a process by the direct chlorination or bromination of the corresponding unsaturated aldehyde, or of the intermediate chlorinated or brominated product.

Other objects will be apparent from a consideration of the specification and claims.

The compounds produced by the process of the invention are referred to herein by the Geneva nomenclature, for example 2,2,3 trichlorobutanal-1. It is to be understood that the compounds may be otherwise designated, such as $\alpha\alpha\beta$ trichlorobutyraldehyde or $\alpha\alpha\beta$ tricholorbutylaldehyde. This butanal compound is also known in the trade as butyl chloral, while the other compounds may be designated as propyl chloral, propyl bromal, butyl bromal, and the like. The hydrate of the compounds may be similarly designated.

As previously pointed out, the process of the present invention involves the direct chlorination or bromination of an unsaturated aldehyde to form the trichloro- or tribromo- compound. The aldehydes which are applicable for use in the process may be represented by the structural formula: $RCH=CH-CHO$, where R is hydrogen or an alkyl group having from 1 to 4 carbon atoms, i. e., a methyl, ethyl, propyl or butyl group. For example, when R is hydrogen, the unsaturated aldehyde is acrolein; and when R is a methyl group, the unsaturated aldehyde is crotonaldehyde.

The compounds formed by the process may be represented by the structural formula:

RHCX—CXX—CHO where R corresponds to the group represented by R in the formula for the unsaturated aldehyde treated by the process, and where X is selected from the group consisting of chlorine and bromine. Thus, when R is hydrogen and X is chlorine, the compound is 2,2,3 trichloropropanal-1; and when R is a methyl group and X is chlorine, the compound is 2,2,3 trichlorobutanal-1. When R represents the ethyl, propyl, and butyl groups, the compound formed is the pentanal, hexanal, and heptanal derivative, respectively. Since 2,2,3 trichlorobutanal-1,2,2,3 trichloropropanal-1, and 2,2,3 tribromobutanal-1 are especially applicable for use in various fields, the process will be described with the preparation of these compounds as examples, but it is to be understood that the process may advantageously be employed in the preparation of the other trichloro- and tribromo-alkanal-1 compounds heretofore mentioned.

The process of the present invention is characterized by the chlorination or bromination of the unsaturated aldehyde or of an intermediate chlorinated or brominated compound in the presence of water to form the 2,2,3 trichloro- or tribromo-alkanal-1. In accordance with the present invention, the tri-derivative is formed by the further chlorination or bromination of the di-derivative, either produced as an intermediate product in the reaction or employed as the initial reactant. In the conversion of the di- to the tri-derivative, an atom of chlorine or bromine is substituted for the hydrogen at the alpha position of the di-derivative. When the unsaturated aldehyde is employed as a starting material, the conditions of the reaction result in the addition of two atoms of material selected from the group consisting of chlorine and bromine to the unsaturated aldehyde to form the di-derivative and further chlorination or bromination, in the presence of water and at a temperature of at least about 50° C., results in the substitution of the chlorine or bromine as above described to form the desired tri-derivative.

The addition of water per se to the material to be chlorinated or brominated followed by chlorination or bromination is preferred since it has been found that such addition gives the best results in the process. Water in the liquid or the vapor phase may be added. Instead of adding water to the material to be chlorinated or brominated, however, a compound or substance, which under the conditions of the reaction generates or gives rise to water so that the chlorination or bromination takes place in the presence of water, may be employed. Herein in the specification and claims where it is stated that water is added or reference is made to added water and other phrases of similar import are used, it is to be understood that water per se, as distinguished from water formed in the course of the reaction, is referred to. The exact mechanism of the effect of water in the chlorination or bromination reaction (which is one of cause and effect) is not definitely understood, but the overall effects of the water appear to be of the catalytic type. In any event, extensive experimental work has shown that, in the presence of water, in accordance with the preferred embodiment of the present invention, the chlorination or bromination and the chlorine or bromine substitution of the unsaturated aldehyde is substantially the sole effect, the formation of chloro- or bromo-hydrins as end products not occurring to any appreciable extent.

If the water is to be formed during the reaction, a compound which will furnish water to the reactants is added to the material to be chlorinated or brominated and the chlorination or bromination conducted as hereinafter will appear. The compound relied upon may be any one or a mixture of a number of substances, and the mechanism of water formation may be generally divided into four types of reaction as follows, although it will be understood that certain compounds may be classifiable by two or more of the reactions and that certain compounds may react in accordance with more than one reaction: (a) by neutralization; (b) by metathesis; (c) by condensation; and (d) by degradation or decomposition.

Referring to the formation of water by neutralization, any compound, inorganic or organic, capable of neutralizing the hydrochloric or hydrobromic acid formed when the chlorine or bromine is passed into the material being treated may be used, for example a compound supplying in water a hydroxide ion such as sodium or potassium carbonate or bicarbonate. The reaction when sodium bicarbonate is used may be illustrated as follows:

$$NaHCO_3 + HCl \rightarrow NaCl + H_2O + CO_2$$

With regard to the formation of water by metathesis, any organic compound capable of reacting in accordance with the equation $$ROH + HCl \rightarrow RCl + H_2O$$

may be employed. Among the compounds capable of reacting in this manner are the monohydric and polyhydric aliphatic alcohols, and of the compounds reacting by metathesis, these compounds are preferred, such as ethyl alcohol, propyl alcohol, the butyl alcohols, glycol, glycerol, sorbitol, mannitol, and the like, particularly those of relatively low molecular weight, especially ethyl alcohol. The term "aliphatic alcohol" as used herein includes in addition to hydroxy compounds of the type given above, derivatives of compounds of that type containing at least one free hydroxyl group, for example the ethyleneglycols, the glycol monoethers, the mono- and dichloroglycerols, the ethanolamines, etc. In place of the compounds mentioned, phenols may be employed, and examples are phenol (which is the preferred phenol), cresol, resorcinol, xylenol, pyrogallol, and the like. In addition, compounds of the type of acetals may be used since they also react by metathesis by generation of the alcohol and the reaction of the regenerated alcohol with the acid, examples of acetals being diethyl acetal and β-chloro-butyraldehyde diethyl acetal.

Referring to the formation of water by condensation, certain substances such as zinc chloride, while not in themselves capable of producing water, can force water from the aldehyde itself or from the intermediate chloro- or bromo-derivative by condensation, and hence may be used in the process to furnish water to the reaction. In addition to zinc chloride, aluminum chloride, cupric chloride, ferric chloride and the like are compounds of this type, but zinc chloride is the most suitable for use in the reaction in producing water by condensation. The use of both zinc chloride and ethyl alcohol functions very satisfactorily to furnish water to the reaction.

The production of water in the reaction by degradation or decomposition may be accomplished by the addition of a compound or substance which under the conditions of reaction decomposes to give water. Examples of such compounds are the sugars, especially the simple sugars such as dextrose, levulose, and the like; and hydrogen peroxide.

Experiments have demonstrated that even if a small amount of water is present during the chlorination or bromination, the 2,2,3 trichloro- or tribromo-alkanal-1 compound can be obtained directly and rapidly at low temperatures, e. g. below 100° C. by bringing chlorine or bromine into contact with the unsaturated aldehyde or the intermediate chlorinated or brominated derivative. The amount of water present may be relatively small, for example a few per cent. such as 1% to 2% or less, based on the compound to be chlorinated or brominated (volume basis). Generally, the amount of water present, for convenience, is maintained at about 5% (volume basis), but, as will appear, the upper limit of water content is not critical as far as the reaction of the invention is concerned. However, except in the case water per se (or hydrogen peroxide) is added, the amount present will be not larger than is found desirable in any particular case since contamination of the product with relatively large amounts of other compounds is to be avoided in most instances. It is to be borne in mind that water has a definite vapor pressure and the byproduct hydrochloric acid gas evolved from the reaction mixture carries away some of the water added or produced and keeps a certain amount in the reflux condenser. Hence, in determining the amount of water to be present, these factors should be taken into consideration. When a compound is employed to produce water as above set forth, an amount of compound is added to furnish the amount of water to the reaction desired in the particular instance.

When water is added as distinguished from water formed in the reaction zone, the amount may be relatively large, for example sufficient to form the hydrate or a relatively dilute solution of the compound, a dilute solution of 2,2,3 trichloro-butanal-1 being of industrial value and of antiseptic usefulness since the compound is a bactericide (Ullman, Enzyklopedie der Technischen Chemie, vol. 2, p. 720). If the hydrate of the 2,2,3 alkanal-1 compound is desired, sufficient water may be added to form the hydrate, and an easily workable ratio of water to crotonaldehyde for combined hydration and crystallization to form 2,2,3 trichlorobutanal-1 hydrate is in the neighborhood of a mol ratio of water to crotonaldehyde of about 6.5 to 1. With respect to the conversion of the di- to the tri-derivative, the upper limit of the amount of water added is in reality only restricted by the difficulties encountered in handling very dilute solutions.

In rather clear delineation of the role of water in the process, reference may be made to the chlorination of crotonaldehyde which, with a $D^{20}_4$ of about 0.857, adds chlorine rapidly until its gravity is about 1.25 and substitution readily ensues until its gravity approaches or arrives at about 1.30, the gravity being a function of the chlorine content of the molecule, a gravity of about 1.30 corresponding to that of the di- chloro compound. In the absence of water, the increase in gravity above about 1.30 is extremely slow and definitely impractical at any atmospheric workable temperature. On the other hand, when the gravity rise has come substantially to rest, at or about 1.30, and the water is furnished, the reaction again will be set in progress and the specific gravity at 20° C. will rise without further difficulty to approximately 1.45. The resulting product when freed of dissolved gases and other impurities will show a specific gravity of about 1.40, a value correct for the industrial grade of 2,2,3 trichlorobutanal-1, and is hydratable, and hence crystallizes out readily. However, from a product of a specific gravity of about 1.37 and higher, the trichloro-derivative may be isolated in substantial quantities by appropriate means.

From the foregoing, it will be clear that the presence of water is necessary to convert the di-derivative into the tri-derivative, and the di-derivative may be used as the starting material in the process. Hence, the claims, which are directed to the step of reacting the di-derivative with chlorine or bromine under the conditions recited to form the tri-compound cover the process broadly and include the formation of the tri-compound from the unsaturated aldehyde, as well as from the di-derivative. The di- compound may be represented by the formula: RCHX—CHX·CHO, where R is the group furnished by the unsaturated aldehyde and where X is selected from the group consisting of chlorine and bromine. It is also clear that when an unsaturated aldehyde is the initial material, the chlorination or bromination may be conducted in the absence of water until the reaction becomes sluggish or stops (the formation of the di-derivative), and then the chlorination or bromination to form the tri-derivative may be completed by chlorinating or brominating in the presence of water.

As previously stated, the temperature maintained during the conversion of the di-derivative to the tri-derivative may be relatively low, that is below 100°, for example in the neighborhood of 50° to 85° C., and the use of such temperatures is preferred. The temperature may be held at the desired point by suitable cooling depending on the rate of chlorine introduction. The use of the stated range of temperature favors the maintenance of water in the reaction mass or zone. Higher temperatures up to the boiling point of the unsaturated aldehyde may be employed if desired, although temperatures above 115° C. are not recommended. In the production of the di-derivative, the temperatures employed may, if desired, be considerably lower.

During the chlorination or bromination, particularly during the conversion of the di-derivative to the tri-compound, an excess of chlorine or bromine over that required at any instant by the reaction rate is advantageously available in order to avoid resinification. While the amount of such chlorine or bromine need not be large, it is desirable that there be ready availablity of chlorine or bromine for reaction at all times. The presence of the excess available chlorine or bromine permits the formation of the tri-compound even if the unsaturated aldehyde contains iron, the presence of which has a marked tendency to cause resinification. The chlorine or bromine is supplied until the chlorination or bromination is completed to form the 2,2,3 trichloro- or tribromo-alkanal-1, and a substantial excess of chlorine or bromine over that required does not deleteriously affect the product.

The chlorine or bromine will be brought into contact with the unsaturated aldehyde or the intermediate product under conditions favoring its absorption by the chemical treated. In the case of chlorine, the rate of gas passage into the reaction vessel in general is the maximum at which substantially complete utilization is obtained. Actually, however, this rate is a rather involved function of the cooling capacity of the reaction set-up and its ability to remove the overall heat of reaction, of the amount of water being used as a catalytic aid, of the temperature being maintained in the reaction mass, of the degree of dispersion of the chlorine or bromine, of the agitation of the reaction mixture, and to some degree the shape of the reaction vessel and other details of equipment and operative procedures. In an illustrative case, when 20 pounds of crotonaldehyde were being chlorinated under conditions of batch operation, chlorine was introduced at the rate of about 7 to 10 pounds per hour. While 1 pound of crotonaldehyde under theoretical conditions will require 2.03 pounds of chlorine, or for each mol of crotonaldehyde which enters into the reaction, 2 mols of chlorine are required, a slight excess, for example 2.10–2.15 pounds or more of chlorine to each pound of crotonaldehyde, depending on the production rate, is advantageously employed.

The reaction may be carried out in simple, non-specialized equipment, and agitation may be furnished mechanically or merely by the incoming gas. The process of the present invention may be conducted as a batch process, if desired, but in the chlorination process, the use of continuous or semi-continuous operation is preferred, employing an absorption tower for the initial treatment of the unsaturated aldehyde with chlorine. The use of a water-cooled absorption tower is preferred in order to favor liquid phase reaction and minimize vapor phase reaction, and, in general, to prevent an excess liberation of heat which might result in an explosion. For example, partial or complete saturation of the double bond of the unsaturated aldehyde by chlorine and, if desired, part of the chlorination by chemical substitution may be effected in such a step. The effluent from the tower may be passed to one of several containers, in parallel or in series, where the chlorination is completed in the presence of water as herein described.

The product of the chlorination or bromination is easily purified, if necessary, but for industrial use the product obtained directly from the process is of satisfactory quality without purification, since the formation of resinous by-products and the like are minimized. It is to be understood that if the conditions of the reaction are such that the 2,2,3 trichloro- or tribromo-alkanal-1 is formed rather than the hydrate, the hydrate may be formed by direct hydration involving the addition of sufficient water to the compound, or by the addition of the compound to water under good agitation.

The following examples are illustrative of the process:

*Example 1*

330 c. c. of crotonaldehyde (approximately 4 mols) was treated with chlorine at such a rate that the addition was accomplished at 50° C. to 60° C., 284 grams (approximately 4 mols) of chlorine being added in one hour. Water was then added in an amount equal to 5 volume per cent. of the starting aldehyde. External heat by means of a boiling water bath was supplied and the chlorination continued for an additional 1.5 hours, 313 grams of chlorine being added within this period. Direct hydration of the resulting liquid gave a white solid which crystallized from water and had a melting point of 78° C. (the known melting point of 2,2,3 trichlorobutanal-1-monohydrate). Its identity was further confirmed by the method of mixed melting points, namely, a mixture of the above material and a material of known identity showed no depression of the melting point. The crude liquid product had a density at 20° C. of 1.446 and distilled at 61° C. under 15 mm. pressure. The purer distillate had a $D^{20}_4$ of 1.401. The residue amounted to 10 to 13 volume per cent. By this procedure, a yield of 90% of the theoretical has been obtained.

*Example 2*

800 c. c. of water and 400 c. c. of crotonaldehyde (a mol ratio of 9 to 1) were mixed. A rapid stream of chlorine was introduced over a period of 4 hours. During the first hour, the reaction temperature maintained itself at 100° C. due to the heat evolved by the reaction. During the remaining 3 hours of the reaction period, external heat was supplied to maintain the reaction temperature substantially at 100° C. At the end of the reaction, the product was cooled and a white solid separated which, extracted with hot water, melted at 75° C.–76° C.

*Example 3*

Crotonaldehyde (10 liters) was passed during 2.5 hours down a water cooled absorption tower against an upward flow of chlorine in amounts somewhat in excess of that required for saturation (8 pounds/hour). The reaction product then travelled to a vessel where it was treated further with chlorine, water in 50 c. c. portions meanwhile being added from time to time until 300 c. c. (3% based on the crotonaldehyde) had been introduced. The reaction temperature was maintained at 70° C. to 90° C. by suitable means and the total time employed for the production of the entire batch of 2,2,3 trichlorobutanal-1 was 6 hours. (The total chlorine introduced was 40 pounds.) Steam distillation of the product gave the hydrate of 2,2,3 trichlorobutanal-1 in a high state of purity and in an amount equal to 95% of the theoretical.

*Example 4*

After 0.1 mol of crotonaldehyde had been converted to the dichloride at 1–10° C. a water bubbler was interposed in the chlorine line and was maintained at 95–100° C. The wet chlorine so obtained was used to further chlorinate the reaction product at 95–100° C. HCl was copiously evolved. After 1.25 hours, the specific gravity was 1.47 and the product readily hydrated producing a crude yield of about 97%.

*Example 5*

Crotonaldehyde (0.1 mol) was treated with bromine (0.1 mol) dropwise and at a temperature below 20° C. The density at this point is about 1.96. Then 0.1 mol water was added and a second 0.1 mol of bromine was added dropwise at a temperature of 50° C. After 3 hours with continuous evolution of HBr reaction appeared to be complete. The density of the crude oil is now about 2.35. The oil is treated with an equal volume of water, the dissolved HBr is buffered with a small quantity of sodium acetate (about 0.1 mol %) and the mixture thoroughly chilled in ice. A solid hydrate separates which after pressing out on a porous plate melts at 54–55° C. Recrystallization from acetic acid-water gives a more stable product melting at 55–56° C.

Example 6

Acrolein (200 cc., 3 mol) was treated with chlorine below 20° C. until chemical saturation was complete. (At this point, the specific gravity is about 1.39.) Then 20 cc. of water was added, the temperature was raised by a boiling water bath and the chlorination was continued for 5.5 hours. HCl was meanwhile copiously evolved and the specific gravity of the crude product rose to 1.57. It was distilled under a pressure of 53–70 mm. and collected within the temperature range 59–79° C. About 10 vol. % of residue remained. The distillate had a specific gravity of 1.59 and when treated with the calculated amount of water for complete hydration, a solid mass of propyl chloral hydrate (2,2,3 trichloropropanal-1 hydrate) was obtained. This product after recrystallization in ethylene dichloride melts at 58–59° C. When acrolein chemically saturated with chlorine (specific gravity 1.39) is further chlorinated in the absence of catalytic water, the specific gravities at hourly intervals are 1.41, 1.41, 1.41+, indicating a cessation of chemical substitution. The necessary specific gravity for practical hydrate formation is 1.57–1.58.

Example 7

Into 40 c. c. crotonaldehyde with cooling to about 60° C., chlorine was passed until more than an equivalent weight of chlorine was taken up or until the specific gravity had reached its normal value of approximately 1.30 when no water or water-yielding material is present. At this point, 10 grams of sodium bicarbonate were added and chlorine introduction resumed and it was observed that the chlorine which had been passing through was now entering into reaction with resultant evolution of heat and of HCl and with an accompanying rise in specific gravity. When chlorine again began to pass through in easily discernible quantities and the heat of reaction ceased to maintain the temperature of the reaction mass, the product was tested for hydratability and the test showed the chlorination was not yet complete since the gravity was low. A further 10 grams of NaHCO₃ were added to provide a make-up source for water observed being lost as vapor in the exit gas stream. Further reaction was evidenced by the practical absence of chlorine in the effluent gas and substantial evolution of HCl. After 1 hour's introduction of chlorine, the resulting chlorinated product showed a crude specific gravity of 1.43 and was hydratable.

Example 8

About .1 mol of crotonaldehyde (8.2 c. c. or 7 grams) was treated with chlorine until absorption appeared complete. Absolute ethanol (0.4 c. c.) was added, the mixture heated under reflux, and the addition of chlorine was continued with every evidence of reaction. After 40 minutes, the reaction appeared to be complete and the liquid had a specific gravity at 20° C. of 1.375. Since this value should have been 1.4 or slightly greater, it was evident that the reaction was not entirely complete. This was evidently due to the loss of ethanol as vapor in the effluent stream of HCl and in confirmation of this and for the purpose of completing the reaction a further addition of ethanol (0.4 c. c.) was added and the introduction of chlorine resumed. It was observed that the reaction was again taking place and when chlorine began to come through the reaction mixture in substantial proportion of the exit gas, the operation was discontinued and the reaction product on test was found to have a specific gravity of 1.41, to be hydratable, and to give the characteristic crystals of 2,2,3 trichlorobutanal-1 hydrate.

Example 9

Glycol (1 cc.) was added to 20 cc. of 2,3-dichlorobutanal-1, obtained from the addition of chlorine to crotonaldehyde, when the $D^{20}_4$ was 1.30. The mixture was then heated by means of a boiling water bath and chlorine in slight excess (about 0.1–0.2 mol/hr.) was passed in with active agitation for one hour. HCl was evolved and after this first hour the specific gravity had risen from 1.30 to 1.36. An additional 5 vol. per cent of glycol was then added and the chlorination was continued for another hour aided by heating at about 100° C. and with agitation. The specific gravity at the end of the second hour was 1.39 and the product formed a solid hydrate when treated with water.

Example 10

Glycerol dichlorhydrin (1 cc.) was added to 20 cc. of 2,3-dichlorobutanal-1, obtained from the addition of chlorine to crotonaldehyde, when the $D^{20}_4$ was 1.30. The mixture was then heated by means of a boiling water bath and chlorine in slight excess (about 0.1–0.2 mol/hr.) was passed in with active agitation for one hour. HCl was evolved. Then an additional 5 vol. per cent glycerol dichlorohydrin was added and the chlorination was continued for another hour aided by heating at about 100° C. and with agitation. The specific gravity at the end of the second hour was 1.39 and the product formed a solid hydrate when treated with water.

Example 11

Tertiary butyl alcohol (1 cc.) was added to 20 cc. of 2,3-dichlorobutanal-1, obtained from the addition of chlorine to crotonaldehyde, when the $D^{20}_4$ was 1.30. The mixture was then heated by means of a boiling water bath and chlorine in slight excess (about 0.1–0.2 mol/hr.) was passed in with active agitation for one hour. HCl was evolved and after this first hour the specific gravity had risen from 1.30 to 1.35. An additional 5 vol. per cent of tertiary butyl alcohol was then added and the chlorination was continued for another hour aided by heating at about 100° C. and with agitation. The specific gravity at the end of the second hour was 1.385 and the product formed a solid hydrate when treated with water.

Example 12

Secondary butyl alcohol (1 cc.) was added to 20 cc. of 2,3-dichlorobutanal-1, obtained from the addition of chlorine to crotonaldehyde, when the $D^{20}_4$ was 1.30. The mixture was then heated by means of a boiling water bath and chlorine in slight excess (about 0.1–0.2 mol/hr.) was passed in with active agitation for one hour. After this first hour, the specific gravity had risen from 1.30 to 1.32. Another 5 vol. per cent of secondary butyl alcohol was then added and the chlorination was continued for another hour aided by heating at about 100° C. and with agitation. The specific gravity at the end of the second hour was 1.35. Finally, another 5 vol. per cent of secondary butyl alcohol was added and the chlorination was continued a third hour aided by heating at about 100° C. and with agitation. The specific gravity at the end of the third hour had risen to 1.37 and the product threw out a solid hydrate when treated with water under efficient cooling.

Example 13

Crotonaldehyde (10 cc., 0.12 mol) and zinc chloride (0.05 gm.) were treated with chlorine below 20° C. until chemical saturation was complete. The temperature was then raised by means of a boiling water bath and the chlorination was continued for 2 hours longer. HCl was evolved. After the first hour the specific gravity was 1.38 and after the second hour the specific gravity of the liquid was 1.39. When treated with water the product developed heat and threw out a white solid on standing.

Example 14

Crotonaldehyde (20 cc., 0.24 mol) was treated with chlorine below 20° C. until chemical saturation was complete. Then 1 cc. of a solution of anhydrous zinc chloride in absolute ethanol (1 gm. $ZnCl_2$/10 cc. EtOH) was added, the temperature raised by employing a boiling water bath and chlorine passed in for 1 hour. HCl was copiously evolved and the specific gravity of the liquid rose to 1.385. At this point, the product readily hydrated. However, another 5% of the alcohol-$ZnCl_2$ solution was added and the material chlorinated for a second hour, after which its specific gravity was 1.395 and it hydrated very readily when treated with water.

Example 15

Crotonaldehyde (10 cc., .12 mol) was treated with chlorine below 0° C. until chemical saturation was complete. Then 1 gm. of dry dextrose was added, the temperature raised by heat from a boiling water bath and the mixture chlorinated for 1 hour. HCl was copiously evolved, the sugar was visibly decomposed, and the specific gravity rose to 1.38. The chlorination was continued for a second hour when the specific gravity rose to 1.39. The dark reaction product was steam distilled after which solid hydrate, of 2,2,3 trichlorobutanal, separated.

Example 16

Crotonaldehyde (10 cc., 0.12 mol) was treated with chlorine below 0° C. until chemical saturation was complete. Then 1 cc. of diethyl acetal was added, the temperature raised externally by a boiling water bath and chlorine was passed in for 1 hour. HCl was evolved, and the specific gravity rose to 1.36. Another 10% of ethyl acetal was added and the chlorination continued another hour. The specific gravity was now 1.38. Finally 5% more acetal was added and the chlorination continued a third hour. The specific gravity after 3 hours of chlorination was then 1.395 and the reaction product developed heat when treated with water.

Considerable modification is possible in the amount of water present during the chlorination or bromination of the unsaturated aldehyde or intermediate product and in the temperature, rate of chlorine and bromine addition, and the like, employed in the reaction without departing from the essential features of the invention.

We claim:

1. The step in the process of preparing a product of the formula RCHX—CXX—CHO, where R is selected from the group consisting of hydrogen and an alkyl group having 1 to 4 carbon atoms and X is selected from the group consisting of chlorine and bromine, which comprises reacting, in the presence of water and at a temperature of at least about 50° C., a compound of the formula RCHX—CHX—CHO, where R is selected from the group consisting of hydrogen and an alkyl group having 1 to 4 carbon atoms and X is selected from the group consisting of chlorine and bromine, with material selected from the group consisting of chlorine and bromine to form said product.

2. The process step of claim 1 wherein the amount of water present is between about 1% and about 5% by volume based on the compound reacted with material selected from the group consisting of chlorine and bromine, and wherein the temperature of the reaction is between about 85° C. and about 100° C.

3. The process step of claim 1 wherein the water is provided by added water.

4. The process step of claim 1 wherein the water is provided by added water, wherein the amount of water is at least sufficient to form the hydrate of the product of the reaction, and wherein the hydrate is crystallized.

5. The process step of claim 1 wherein the water is provided by a compound which under the conditions of the reaction furnishes water, the said compound being present in an amount to maintain between about 1% and about 5% of water based on the compound reacted with material selected from the group consisting of chlorine and bromine.

6. The step in the process of preparing 2,2,3 trichloropropanal-1, which comprises reacting, in the presence of water and at a temperature of at least about 50° C., a compound of the formula HCHCl—CHCl—CHO, with chlorine to form said product, there being present during the reaction a ready availability of chlorine for reaction with said compound.

7. The process step of claim 6 wherein the water is provided by added water and the amount of water present is between about 1% and about 5% by volume based on the compound reacted with chlorine, and wherein the temperature of the reaction is between about 85° C. and about 100° C.

8. The process of preparing a product of the formula RCHX—CXX—CHO, where R is selected from the group consisting of hydrogen and an alkyl group having one to four carbon atoms and X is selected from the group consisting of chlorine and bromine, directly from an unsaturated aldehyde of the formula RCH=CH—CHO, where R is selected from the group consisting of hydrogen and an alkyl group having one to four carbon atoms, which comprises reacting said unsaturated aldehyde with material selected from the group consisting of chlorine and bromine to form a di-derivative of said aldehyde, and further reacting said di-derivative at a temperature of at least about 50° C. with said material to convert said di-derivative into the aforesaid tri-derivative, at least the conversion of the di-derivative to the tri-derivative being carried out in the presence of water.

9. The process of preparing the hydrate of a product of the formula RCHX—CXX—CHO, where R is selected from the group consisting of hydrogen and an alkyl group having one to four carbon atoms and X is selected from the group consisting of chlorine and bromine, directly from an unsaturated aldehyde of the formula

RCH=CH—CHO where R is selected from the group consisting of hydrogen and an alkyl group having one to four carbon atoms, which comprises reacting said unsaturated aldehyde with material selected from the group consisting of chlorine and bromine to form a di-derivative of said aldehyde, further reacting said di-derivative at a temperature of at least about 50° C. with said material to convert said di-derivative into the aforesaid tri-derivative, at least the conversion of the di-derivative to the tri-derivative being carried out in the presence of at least a sufficient amount of added water to form a hydrate of the product of the reaction, and crystallizing said hydrate.

10. The process of preparing 2,2,3 trichloropropanal-1 directly from acrolein which comprises reacting acrolein with chlorine to form the dichloro-derivative thereof, and further reacting said dichloro-derivative at a temperature of at least about 50° C. with chlorine to convert said dichloro-derivative into the aforesaid trichloro-derivative, at least the conversion of the dichloro-derivative to the tri-chloro-derivative being carried out in the presence of water and with a ready availability of chlorine for reaction.

11. The process of preparing 2,2,3 trichloropropanal-1 directly from acrolein which comprises adding water to acrolein and reacting chlorine therewith to form the dichloro-derivative thereof, and further reacting said dichloro-derivative at a temperature of at least about 50° C. with chlorine to convert said dichloro-derivative into the aforesaid trichloro-derivative, there being present during the chlorination a ready availability of chlorine for reaction.

12. The step in the process of preparing 2,2,3 trichlorobutanal-1 which comprises reacting in the presence of water and at a temperature of at least about 50° C., a compound of the formula H₃CCHCl—CHCl—CHO with chlorine to form said product, there being present during the reaction a ready availability of chlorine for reaction with said compound.

13. The process step of claim 12 wherein the water is provided by added water and the amount of water present is between about 1% and about 5% by volume based on the compound reacted with chlorine, and wherein the temperature of the reaction is between about 85° C. and about 100° C.

14. The process of preparing 2,2,3 trichlorobutanal-1 directly from crotonaldehyde, which comprises reacting crotonaldehyde with chlorine to form the dichloro-derivative thereof, and further reacting said dichloro-derivative at a temperature of at least about 50° C. with chlorine to convert said dichloro-derivative into the aforesaid trichloro-derivative, at least the conversion of the dichloro-derivative to the trichloro-derivative being carried out in the presence of water and with a ready availability of chlorine for reaction.

15. The process of preparing 2,2,3 trichlorobutanal-1 directly from crotonaldehyde, which comprises adding water to crotonaldehyde and reacting chlorine therewith to form the dichloro-derivatives thereof, and further reacting said dichloro-derivative at a temperature of at least about 50° C. with chlorine to convert said dichloro-derivative, there being present during the chlorination a ready availability of chlorine for reaction.

RALPH L. BROWN.
RALPH E. PLUMP.